United States Patent
Vian et al.

(10) Patent No.: US 8,068,983 B2
(45) Date of Patent: Nov. 29, 2011

(54) VIRTUAL ENVIRONMENT SYSTEMS AND METHODS

(75) Inventors: John L. Vian, Renton, WA (US); Emad W. Saad, Renton, WA (US); Stefan R. Bieniawski, Seattle, WA (US); el-Hadi M. Aggoune, Brier, WA (US)

(73) Assignee: The Boeing Company, Chicago, IL (US)

( * ) Notice: Subject to any disclaimer, the term of this patent is extended or adjusted under 35 U.S.C. 154(b) by 758 days.

(21) Appl. No.: 12/137,348

(22) Filed: Jun. 11, 2008

(65) Prior Publication Data

US 2009/0313566 A1 Dec. 17, 2009

(51) Int. Cl.
*G01C 21/30* (2006.01)
*G05D 3/00* (2006.01)

(52) U.S. Cl. .............. 701/211; 701/1; 701/36; 701/37; 701/108

(58) Field of Classification Search .................. 715/765; 701/1, 36, 37, 108; 702/113, 1, 127, 108, 702/187, 189
See application file for complete search history.

(56) References Cited

U.S. PATENT DOCUMENTS

| | | | |
|---|---|---|---|
| 5,489,830 A | 2/1996 | Fernandez | |
| 5,637,826 A | 6/1997 | Bessacini et al. | |
| 5,721,680 A | 2/1998 | Van Cleve et al. | |
| 5,892,221 A * | 4/1999 | Lev | 250/222.1 |
| 5,909,218 A | 6/1999 | Naka et al. | |
| 5,910,903 A * | 6/1999 | Feinberg et al. | 703/6 |
| 6,215,498 B1 * | 4/2001 | Filo et al. | 345/419 |
| 6,896,220 B2 | 5/2005 | McKendree et al. | |
| 6,955,324 B2 | 10/2005 | Tanielian | |
| 7,042,440 B2 * | 5/2006 | Pryor et al. | 345/158 |
| 7,054,724 B2 | 5/2006 | Koshizen et al. | |
| 7,099,747 B2 | 8/2006 | Mikami et al. | |

(Continued)

FOREIGN PATENT DOCUMENTS

DE 19731724 1/1999

(Continued)

OTHER PUBLICATIONS

Lam, et al., "Tele-operating a UAV using Haptics—Modeling the Neuromuscular System", Systems, Man and Cybernetics, 2005 IEEE International Conference on Waikoloa, HI, Oct. 10-12, 2005, vol. 3, pp. 2695-2700.

(Continued)

*Primary Examiner* — Khoi Tran
*Assistant Examiner* — Ian Jen
(74) *Attorney, Agent, or Firm* — Caven & Aghevli LLC

(57) ABSTRACT

Representing vehicles in a customizable virtual environment is disclosed. One embodiment includes a controlled environment including prototype vehicles and a virtual environment including virtual representations of the prototype vehicles. The virtual environment is a display that includes an environment scenario, a number of virtual objects, and the various represented vehicles. The represented vehicles are linked to the prototype vehicles by communicating kinematic data from the prototype vehicles to the virtual vehicles real-time. The positions of the represented vehicles are updated based on the communicated kinematic data such that the virtual environment is a realistic visualization of the prototype vehicles. In addition, the virtual environment is highly customizable. In an embodiment, customizing the virtual environment includes generating reference views for the represented vehicles, editing the environment scenario, editing the virtual objects, editing the represented vehicles, and generating a mission scenario of the reference views.

18 Claims, 6 Drawing Sheets

U.S. PATENT DOCUMENTS

| | | | |
|---|---|---|---|
| 7,313,463 | B2 | 12/2007 | Herr et al. |
| 7,400,950 | B2 | 7/2008 | Reich |
| 2002/0128806 | A1* | 9/2002 | Anderson et al. .................. 703/2 |
| 2002/0142701 | A1 | 10/2002 | Rosenberg |
| 2003/0215771 | A1* | 11/2003 | Bartoldus et al. ............... 434/14 |
| 2004/0073359 | A1 | 4/2004 | Ichijo et al. |
| 2004/0218910 | A1* | 11/2004 | Chang et al. ..................... 386/98 |
| 2004/0219491 | A1* | 11/2004 | Shlomo ............................ 434/11 |
| 2005/0027406 | A1 | 2/2005 | Nonami et al. |
| 2005/0125099 | A1 | 6/2005 | Mikami et al. |
| 2005/0253872 | A1* | 11/2005 | Goss et al. ..................... 345/660 |
| 2006/0073439 | A1 | 4/2006 | Tengblad ........................ 434/12 |
| 2006/0080077 | A1* | 4/2006 | Johnson et al. ................. 703/22 |
| 2006/0082546 | A1 | 4/2006 | Wey |
| 2006/0181535 | A1* | 8/2006 | Watt ............................... 345/473 |
| 2008/0033684 | A1 | 2/2008 | Vian et al. |
| 2008/0049012 | A1* | 2/2008 | Bar-Joseph et al. ........... 345/419 |
| 2008/0077383 | A1* | 3/2008 | Hagelin et al. .................. 703/21 |
| 2010/0169797 | A1* | 7/2010 | Lynk et al. ..................... 715/757 |

FOREIGN PATENT DOCUMENTS

| | | |
|---|---|---|
| GB | 2345952 | 7/2000 |
| WO | WO9918555 | 4/1999 |
| WO | WO03027599 | 4/2003 |
| WO | WO2005003676 | 1/2005 |

OTHER PUBLICATIONS

Carlson et al, "Reliability Analysis of Mobile Robots", Robotics and Automation, 2003, Proceedings ICRA 03, IEEE Int'l Conf on Sep. 2003, vol. 1, 8 pgs.

Castillo-Effen et al, "Modeling and Visualization of Multiple Autonomous Heterogeneous Vehicles", Systems, Man and Cybernetics, 2005 IEEE Int'l Conference, Oct. 2005, vol. 3, 9 pgs.

Chung et al, "A Platform for Cooperative and Coordinated Control of Multiple Vehicles", In Proc. of the 3rd Conf on Cooperative Control and Optimization, Dec. 2002, Chapter 1, pp. 1-33.

Cremean et al, "The Caltech Multi-Vehicle Wireless Testbed", Decision and Control, 2002, Proceedings of the 41st IEEE Conference, Dec. 2002, vol. 1, 3 pgs.

Holland et al., "Beyond Swarm Intelligence: The Ultraswarm", Swarm Intelligence Symposium SIS 2005, Proceedings 2005 IEEE, Jun. 2005, 8 pgs.

McNeely et al, "Six Degree-of-Freedom Haptic Rendering Using Voxel Sampling," Proc. ACM SIGGRAPH 99 Conf., Los Angeles, CA, Aug. 1999, pp. 401-408.

McNeely, et al, "Voxel-Based 6-DOF Haptic Rendering Improvements," Haptics-e, vol. 3, No. 7, Jan. 2006, 12 pgs.

Nardi et al, "SwarMAV: A Swarm of Miniature Aerial Vehicles", 21st Bristol Interl UAV Systems Conf, Apr. 2006, 9 pgs.

Narli et al, "A Hardware-in-the-Loop Test Rig for Designing Near-Earth Aerial Robotics", Proceedings of the 2006 IEEE Int'l Conference on Robotics and Automation, Orlando, Florida, May 2006, pp. 2509-2514.

Rizos, "Pseudolite Augmentation of GPS", presented at workshop on Geolocation and Navigation technology to support environmental geophysical mapping applications, organized by Strategic Environmental Research and Development Prog and Environmental Security Technology Certif Prog, May 2005, 15 pgs.

Troy, et al, "Closed-Loop Motion Capture Feedback Control," (In Review), 2006, 2 pgs.

Troy, "Haptic Control of a Simplified Human Model with Multibody Dynamics," Phantom Users Group Conf., Aspen, CO, Oct. 2000, pp. 43-46.

Vachtsevanos et al, "From Mission Planning to Flight Control of Unmanned Aerial Vehicles: Strategies and Implementation Tools", Annual Reviews in Control, 29 (2005), pp. 101-115.

* cited by examiner

VIRTUAL ENVIRONMENT SYSTEMS AND METHODS

TECHNICAL FIELD

The disclosure relates to systems and methods for generating a customizable virtual environment and, more particularly, to representing vehicles in the virtual environment.

BACKGROUND

Existing methods of representing vehicles in a virtual environment typically involve computer simulations. In a common computer simulation, computers are used to simulate vehicle dynamics using algorithms. The accuracy of computer simulations heavily relies on how well the models are validated. Validation is often time-consuming and expensive, but necessary to generate high fidelity computer simulations. Even when the computer simulation is thoroughly validated, the computer simulation is still limited as a mathematical representation of reality and is thus inherently an approximation at best of the kinematics of vehicles operation. Such approximations have a tendency to undesirably simplify many of the complexities of the actual system that is being represented.

Another approach is to use historical data collected from a real environment to assist in the creation of a virtual environment. However, historical data may be difficult to obtain, require interaction with environments which may not be available, and may not include enough flexibility to make ad hoc simulations.

Generally speaking, traditional methods of representing vehicles in a virtual environment may benefit from improved dynamic accuracy and increased feasibility. Accordingly, there is a need for improved techniques that create a more accurate and feasible method of representing vehicles in a virtual environment.

SUMMARY

Embodiments of methods and systems for representing vehicles in a virtual environment are disclosed. Embodiments may advantageously provide a more feasible way to increase the dynamic accuracy of virtually represented vehicles.

In an embodiment, a method for representing vehicles on a situational display includes generating a virtual environment containing an environment scenario, various objects typically found in the environment scenario, and various represented vehicles. The situational display generates realistic visualizations of various vehicle missions by updating the displayed represented vehicles based on kinematic data that is being received from prototype vehicles that are realistically moving about in a controlled environment. The reference views of the display system may be updated and changed in real-time so that the vehicles in the virtual environment are displayed from various points of view. Furthermore, the environment scenario, objects, and represented vehicles are all customizable such that the situational display may be used to generate any conceivable vehicle mission.

In yet another embodiment of the present disclosure, one or more computer-readable media comprise computer executable instructions that, when executed, perform a method of representing vehicles in a virtual environment. The virtual environment includes a customizable environment scenario and customizable objects. Realistic visualizations of various vehicle missions are generated by updating the represented vehicles based on kinematic data that is being received from prototype vehicles that are realistically moving about in a controlled environment. The represented vehicles may be viewed from various reference angles such as a first person vehicle operator view, a third person view, and a bird's eye view. Internal data packages may be generated based on the kinematic data of the represented vehicles and may be exported to an external entity.

In yet another embodiment, a method for generating a mission scenario includes recording various reference views of a virtual environment. Any desired combination of reference views may be recorded to create the desired mission scenario. The recorded mission scenarios are stored to enable retrieval or exportation The features, functions, and advantages may be achieved independently in various embodiments of the present disclosure or may be combined in yet other embodiments.

BRIEF DESCRIPTION OF THE DRAWINGS

Structures and techniques in accordance with various exemplary embodiments of the present disclosure are described in detail below with reference to the following drawings. As used herein, the term "exemplary" identifies an example and not necessarily an ideal.

DETAILED DESCRIPTION

Overview

Methods and systems for representing vehicles in a virtual environment are described herein. Many specific details of certain embodiments of the present disclosure are set forth in the following description and in FIGS. 1 through 6 to provide a thorough understanding of such embodiments. One skilled in the art, however, will understand that the present disclosure teaches various additional embodiments, or that one or more embodiments of the present disclosure may be practiced without several of the details described in the following description.

Current virtual environment methods are not able to adequately represent realistic visualizations. Improved realistic visualization that may be gained through utilizing real dynamic data and a customizable virtual environment is not realized by current methods. Therefore, methods, processes, and techniques are described herein to provide improved virtual environments.

Generally speaking, the disclosure describes various embodiments of a virtual environment. Embodiments of the present disclosure may be utilized in one or more situations including proof of concept demonstrations and evaluations of new technologies. More specifically, the virtual environment may be used to demonstrate and evaluate various vehicles in various environment scenarios. For example, the virtual environment may be used to demonstrate and evaluate air vehicles surveying enemy areas, ground vehicles carrying out a ground mission, robot vehicles performing maintenance, human vehicles performing border control, and/or water vehicles carrying out a water mission. Although embodiments may use various environment scenarios, the virtual environment will be described in an airspace/ground environment scenario which includes both represented air vehicles and represented ground vehicles, as one of many possibilities.

As used herein, the term "vehicles" is intended to include air vehicles, unmanned vehicles (UVs), water vehicles, ground vehicles, humans, robots, model vehicles, and any other object which may be manipulated in the real world and projected in a virtual environment. Similarly, the term "environment scenario" is intended to include urban environments, mountainous terrain, desert terrain, indoor scenery, border control environments, monitoring sites, battlefields, maintenance hangers, forests, and any other environment in which the vehicles may operate. Based on the disclosure, a person of ordinary skill would be able to use the virtual environment in other situations.

Figure 1:
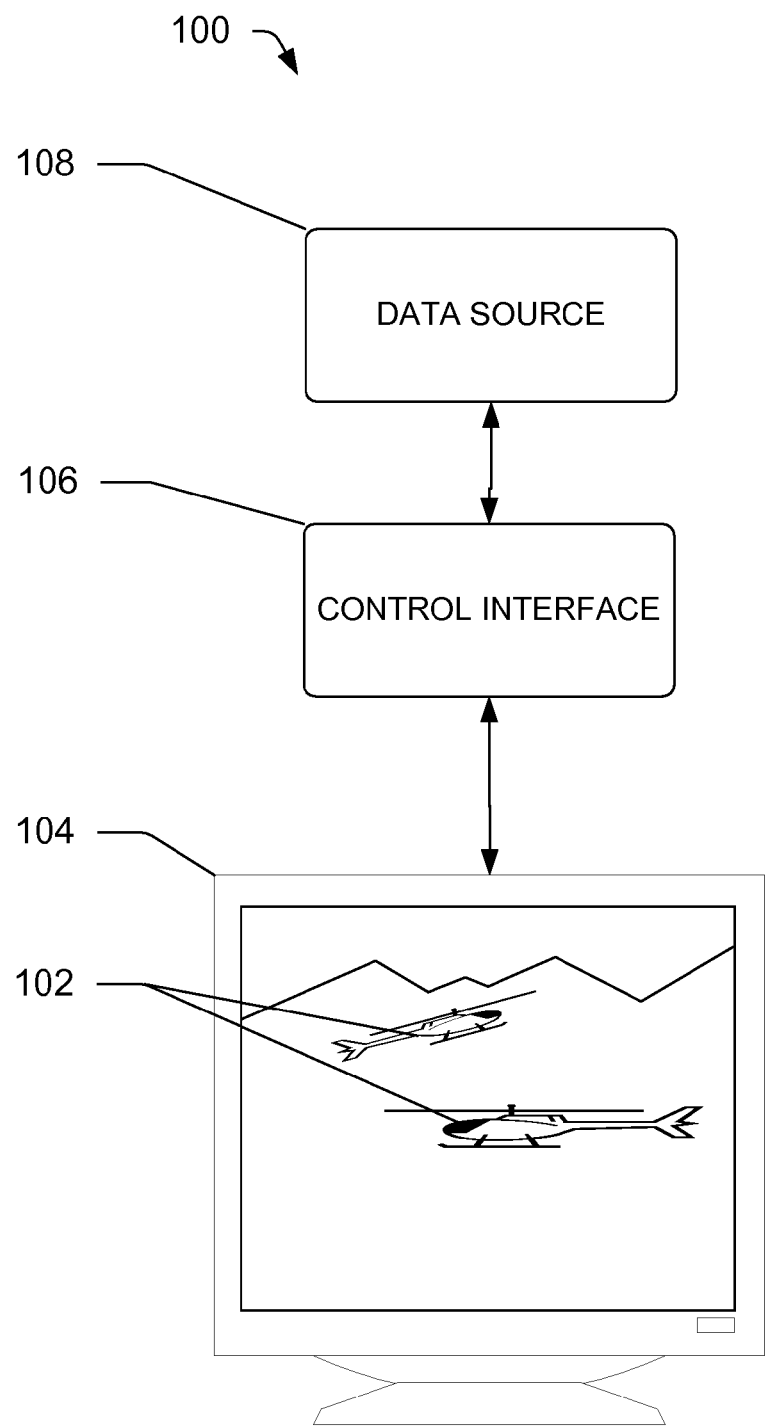
FIG. 1 is a schematic for generating a virtual environment.

FIG. 1 is a schematic 100 for generating a virtual environment. As depicted in FIG. 1, represented vehicles 102 are animated in a situational display 104 using data parameters received over a control interface 106 from a data source 108. The data source 108 acquires the data parameters, packages the data parameters to create data packages, and communicates the packaged data parameters to the situational display 104. Once received at the situational display, the data parameters of the data package are used to animate the represented vehicles 102 by updating the position of the represented vehicles on the situational display 104. In one embodiment the data parameters comprise kinematic data including six degree-of-freedom data as well as full vectors describing the attitude of the vehicles. In such embodiment, the situational display 104 animates the represented vehicles 102 by updating the position of the represented vehicles based on the six degree-of-freedom data and vectors describing the attitude of the vehicles. Since the animation of the represented vehicles 102 is driven by the data parameters, the quality of the animation is limited to the quality of the data parameters. Thus, it is critical that the data source 108 acquires quality data parameters.

The data source 108 may acquire the data parameters using various methods such as generating the data parameters internally or inputting the data parameters from an external source. The data source 108 may generate the data parameters internally by tracking kinematic data of prototype vehicles in a controlled environment and/or the data source may acquire the data parameters via an external simulation. For example, the data parameters may be generated by tracking kinematic data of remote control vehicles moving about in a laboratory. In addition to or in place of generating the data parameters by tracking kinematic data of remote control vehicles, the data source may, for example, use a computer simulation comprising mathematical algorithms to generate the data parameters. As further described below in FIG. 2, tracking kinematic data of prototype vehicles in a controlled environment enables the data source to acquire data parameters that reflect the kinematic data of prototype vehicles that are actually flying around in a laboratory.

Although the represented vehicles 102 depicted in FIG. 1 are vertical take-off and landing (VTOL) vehicles, the represented vehicles 102 may be of any of the vehicle types described above. With further respect to FIG. 1, the situational display 104 which displays the represented vehicles 102 may be any type of display such as a computer monitor, a television monitor, or a personal digital assistant (PDA).

Figure 2:
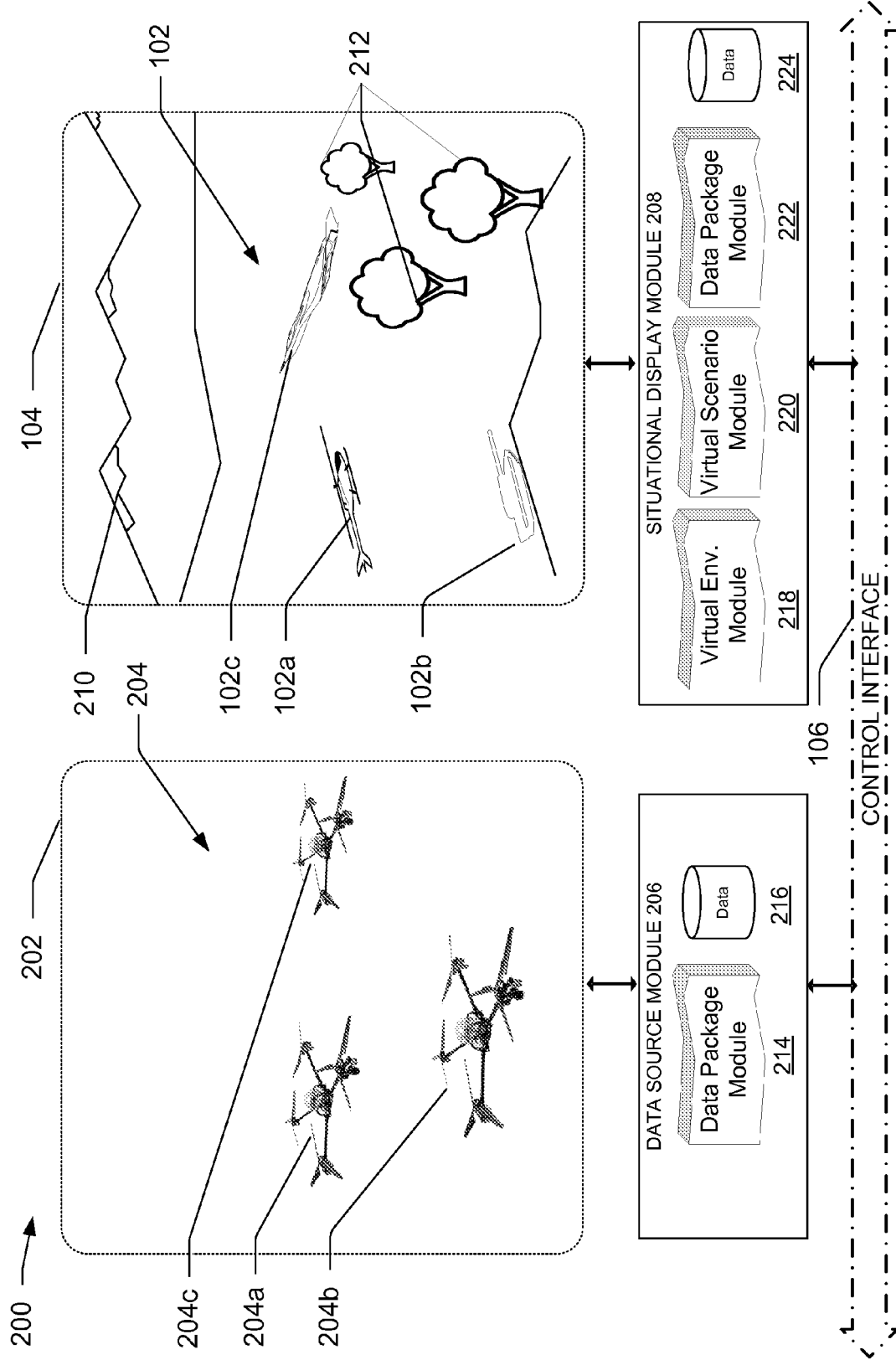
FIG. 2 is a schematic of an illustrative embodiment of the virtual environment including a controlled environment and a situational display.

FIG. 2 is a schematic depicting an exemplary concept 200 of a virtual environment. The exemplary virtual environment of FIG. 2 depicts the data source (108 of FIG. 1) comprised of a controlled environment 202 including one or more prototype vehicles 204 and a data source module 206. The prototype vehicles 204 include any type of prototype vehicles, such as fixed-wing prototype vehicles, VTOL prototype vehicles, ground prototype vehicles, or other vehicles. The virtual environment further includes the represented vehicles 102 displayed in the situational display 104. The situational display 104 communicates with the control interface 106 via a situational display module 208. Since the represented vehicles 102 are animated representations of the data source 108, the represented vehicles 102 in FIG. 2 are animated representations of the prototype vehicles 204. As mentioned above, the quality of the animation is limited to the quality of the data parameters. As depicted in FIG. 2, the data source module 206 realistically controls the represented vehicles 102 by capturing the kinematic data from the prototype vehicles 204, communicating the kinematic data to the situational display 104, and then updating the displayed represented vehicles 102 based on the kinematic data.

The situational display 104 displays the represented vehicles 102, an environment scenario 210, and a number of virtual objects 212. The represented vehicles 102 may be any vehicle type such as a vertical take-off and landing (VTOL) represented vehicle 102a, a ground represented vehicle 102b, and a fixed-wing represented vehicle 102c. The environment scenario 210 may be any environment that the represented vehicles 102 may encounter such as an urban environment, mountainous terrain, desert terrain, indoor scenery, border control environments, monitoring sites, battlefields, maintenance hangers, forests, and any other environment in which the vehicles may operate. Based on the disclosure, a person of ordinary skill would be able to use the virtual environment 104 in other situations. The virtual objects 212 include objects that the environment scenario 210 may contain such as plants, buildings, lakes, or minerals. In one implementation, the virtual objects 212 are trees.

The represented vehicles 102 correspond to the prototype vehicles 204. For example, the VTOL represented vehicle 102a is a virtual representation of the prototype vehicle 204a, and so forth. The represented vehicles 102 may be of the same vehicle type as the corresponding prototype vehicle or they may be of a different vehicle type. As an example, a remote control helicopter vehicle may be represented by either a helicopter represented vehicle or a fixed wing represented vehicle.

As mentioned above, the represented vehicles 102 in the situational display 104 are controlled in part by the kinematics of the prototype vehicles 204. This realistic behavior is accomplished by passing data packages between the controlled environment 202 and the situational display 104 via a control interface 106 such as a network. Various control modules assist in this communication process including a data source module 206 and a situational display module 208.

As depicted in FIG. 2, a data source module 206 connects vehicles, activity, etc., in the controlled environment 202 to the control interface 106. The data source module 206 includes a prototype vehicle data package module 214 that generates prototype vehicle data packages 216 for the various prototype vehicles 204. The prototype vehicle data package module 214 may generate one data package per prototype vehicle or a single data package may contain data for multiple prototype vehicles 204. The data package includes various data parameters for the vehicles. In some embodiments, the data parameters comprise kinematic data including six degree-of-freedom data as well as full vectors describing the attitude of the vehicles. The data package may also include vehicle capability and health data, command data, and sensor data. Vehicle capability and health data may include sensor payload, speed, turn radius, and engine temperature. Command data may include waypoint commands, task commands, and area search parameters. Additionally, sensor data may include video feed from an on-board camera. The prototype vehicles 204 communicate the data parameters to the data source module 206 via a method of communication such as a transmitter, a satellite system, or a wifi network. The data source module 206 communicates the prototype vehicle data package 216 to the situational display 104 via the control interface 106. The situational display 104 may display the data parameters of the prototype vehicle data package 216 in a graphical format, a text based format, or a combination of both graphical and text based formats.

As further depicted in FIG. 2, a situational display module 208 connects the situational display 104 to the control interface 106. The situational display module 208 receives the prototype vehicle data package 216 from the control interface 106 and updates the positions of the represented vehicles 102 according to the data parameters contained in the prototype vehicle data package 216. The represented vehicles 102 are updated real-time such that watching the represented vehicles 102 on the situational display 104 is a realistic visualization of the behavior of the prototype vehicles 204. The situational display module 208 further includes a virtual environment module 218 and a virtual scenario module 220.

The virtual environment module 218 customizes the situational display 104 according to desired concepts of operations. As described further in FIGS. 3 and 4, the situational display 104 may be customized by generating one or more reference views to display the represented vehicles 102 operating in the environment scenario 210. Additionally, as described further in FIGS. 5 and 6, the situational display 104 may be further customized by editing the situational display. Editing the situational display 104 may include editing the environment scenario 210, editing the represented vehicles 102, and/or editing the virtual objects 212. As described further in FIG. 6, the virtual scenario module 220 generates a mission scenario by recording various reference view.

As mentioned above, the situational display module 208 updates the represented vehicles 102 based on the data parameters stored in the prototype vehicle data package. In one implementation, the situational display module 208 includes a User Datagram Protocol (UDP) messaging scheme to update the displayed represented vehicles 102 based on the prototype vehicle data package 214.

The control interface 106 may be any type of interface such as a wireless network, cellular network, WiFi, Satellite, Bluetooth, radio frequency identification (RFID), Ultraband, or other types of network systems. The control interface 106 allows bi-directional communication to exist between the controlled environment 202 and the situational display 104 such that data may be communicated from the controlled environment to the situational display as well as from the situational display 104 to the controlled environment.

In accordance with one or more embodiments, the situational display module 208 further includes a represented vehicle data package module 222 to capture and store data parameters for the represented vehicles 102. In such an embodiment, the represented vehicle data package module 222 stores the represented vehicles data parameters in one or more represented vehicle data packages 224. The situational display module 208 may communicate, via the control interface 106, the represented vehicle data package 224 to an external source such as a simulation system, a data storage device, or to the data source module 206. In the case that the situational display module 208 sends the data package to the data source module 206, the position of the prototype vehicles 204 may be updated based on the represented vehicle data parameters. In such an embodiment, the represented vehicles 102 may be used to control the prototype vehicles 204.

Virtual Environment Module: Reference Views

Figure 3:
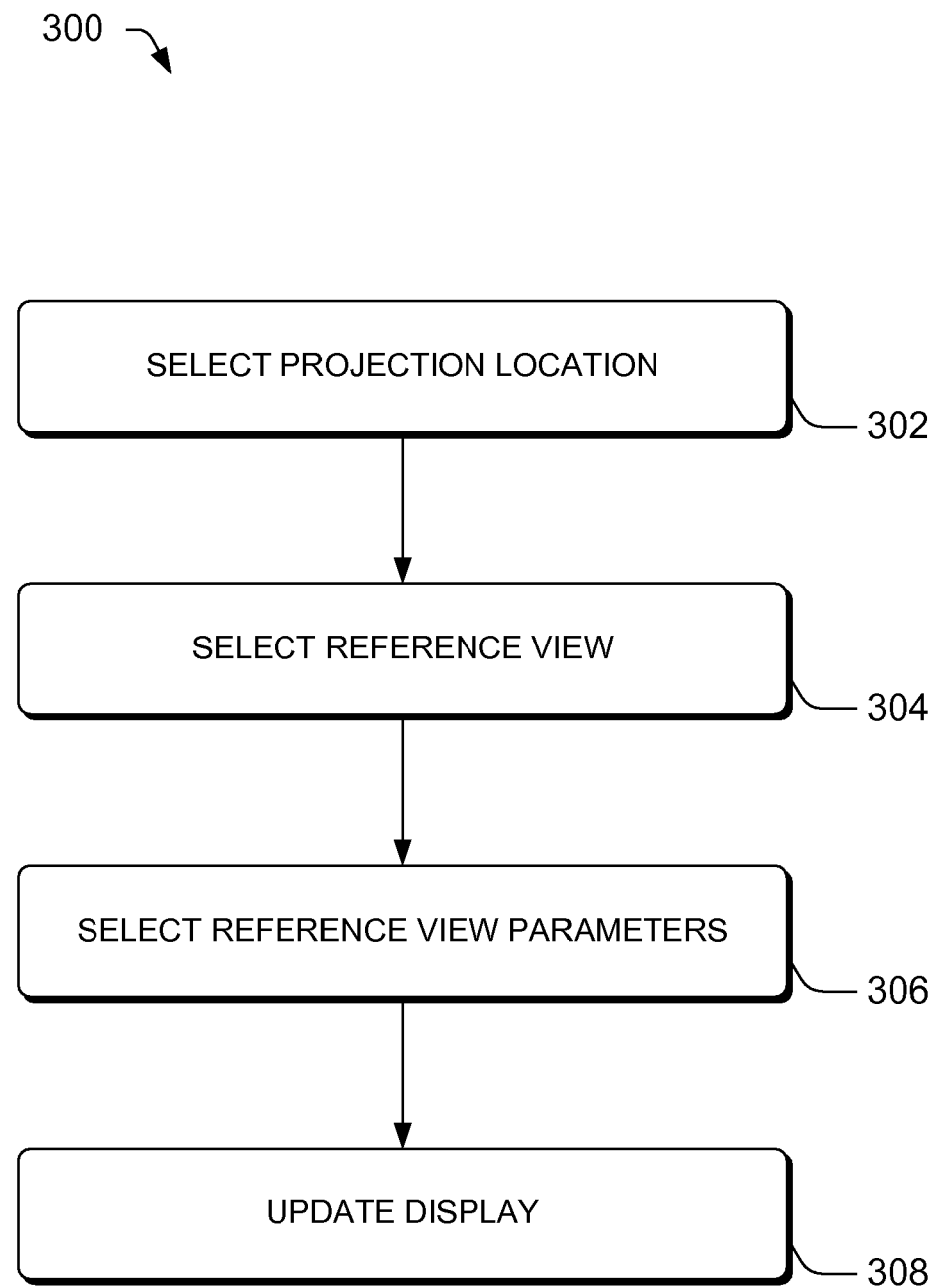
FIG. 3 is a flow diagram for generating virtual environment reference views in accordance with one or more embodiments of the disclosure.

FIG. 3 is a flow diagram for a process 300 of customizing the virtual environment in accordance with an embodiment of the present disclosure. The process 300 is illustrated as a collection of blocks in a logical flow graph, which represent a sequence of operations that may be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process. Other processes described through this disclosure, in addition to process 200, shall be interpreted accordingly.

As mentioned above the virtual environment module 218 may customize the situational display 104 by generating and editing various reference views. The reference views display the represented vehicles 102 operating in the environment scenario 210. Editing the situational display 104 may include editing the environment scenario 210, editing the represented vehicles 102, and/or editing the virtual objects 212.

The generated reference views may be displayed in various projection locations within the situational display 302 such as in a main window or in a picture-in-picture (PIP) window. In addition, the generated reference view may consist of any reference view location 304 such as a first person vehicle operator view, third person view, bird's eye view, heads-up display view, trajectory view, and customized view. The customized view may include a view of the situational display from any location selected within the situational display.

Depending on the desired reference view location 304, various reference view parameters further define and customize the selected reference view 306. For example, if the reference view is set to third person view, the reference view parameters may include a pan angle, a tilt angle, a camera translation increment, and a zoom increment. At a block 308, a virtual environment view is generated by displaying the desired reference view (selected at block 304) in the desired reference view location (selected at block 302). The process 300 may be executed at any point when the situational display 104 is operating. For example, the pan, tilt, and zoom parameters may be used within a first person reference view to track and survey another represented vehicle that is also present in the situational display 104.

Figure 4:
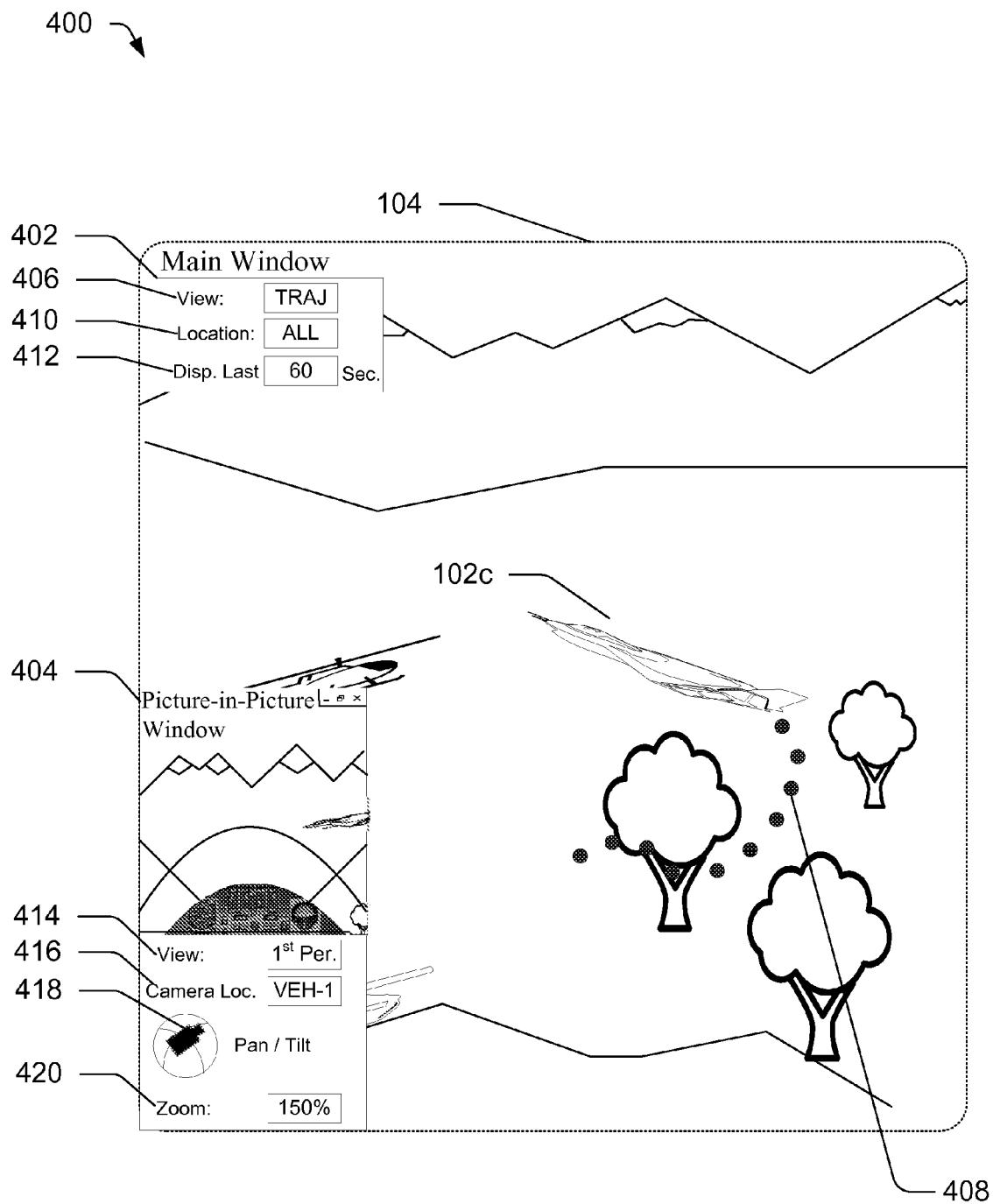
FIG. 4 is an exemplary display depicting various reference views of the virtual environment in accordance with some embodiments of the disclosure.

FIG. 4 is an exemplary display 400 depicting various generated reference views of the situational display 104 in accordance with an embodiment of the present disclosure. The situational display 104 may include various generated references views such as a main window reference view 402 and PIP window reference view 404.

The main window reference view 402 may include various parameters (block 306 of FIG. 3) that further define and customize the main window reference view such as a point-of-view 406, a location for which to apply the point of view 408, and a view type parameter 412 that may be unique to the selected point-of-view 406. In some embodiments, the main window reference view 402 is set to trajectory view 406. In such an embodiment, the past positions of one or more represented vehicles 102 may be displayed in the situational display 104 as trajectory traces 408. As further exemplified in FIG. 4, the trajectory view may further be defined by applying the trajectory view location to all represented vehicles 410 and establishing a desired time duration for the trajectory view 412.

The PIP reference view 404 may include various parameters that further define and customize the PIP reference view such as a point-of-view 414, a camera location 416, a pan/tilt orientation 418, and a zoom increment 420.

In one implementation, the PIP reference view is set to first person 414. In such implementation, the first person point-of-view is generated for the desired reference view location 416. As further exemplified in FIG. 4, the first person view 414 may by further defined by applying the first person view location to the represented vehicle (102a of FIG. 1) 416, setting the desired pan/tilt orientation 418, and defining a zoom increment 420. Examples of other possible point-of-views that may be applied to any generated reference view (such as the main window reference view 402 and the PIP reference view 404) include first person vehicle operator view, third person view, bird's eye view, heads-up display view, trajectory view, and customized view. Both the main window and the PIP window 404 are updated real-time to reflect the selected parameters.

In some embodiments, the reference view may be a customizable view. The customizable reference view may be used to generate a time dependent reference view. The parameters of a time dependent reference view may include selecting reference locations within the situational display 104 as a function of time such that the displayed reference view is a moving reference view that follows a smooth path as a function of time.

Virtual Environment Module: Situational Display

Figure 5:
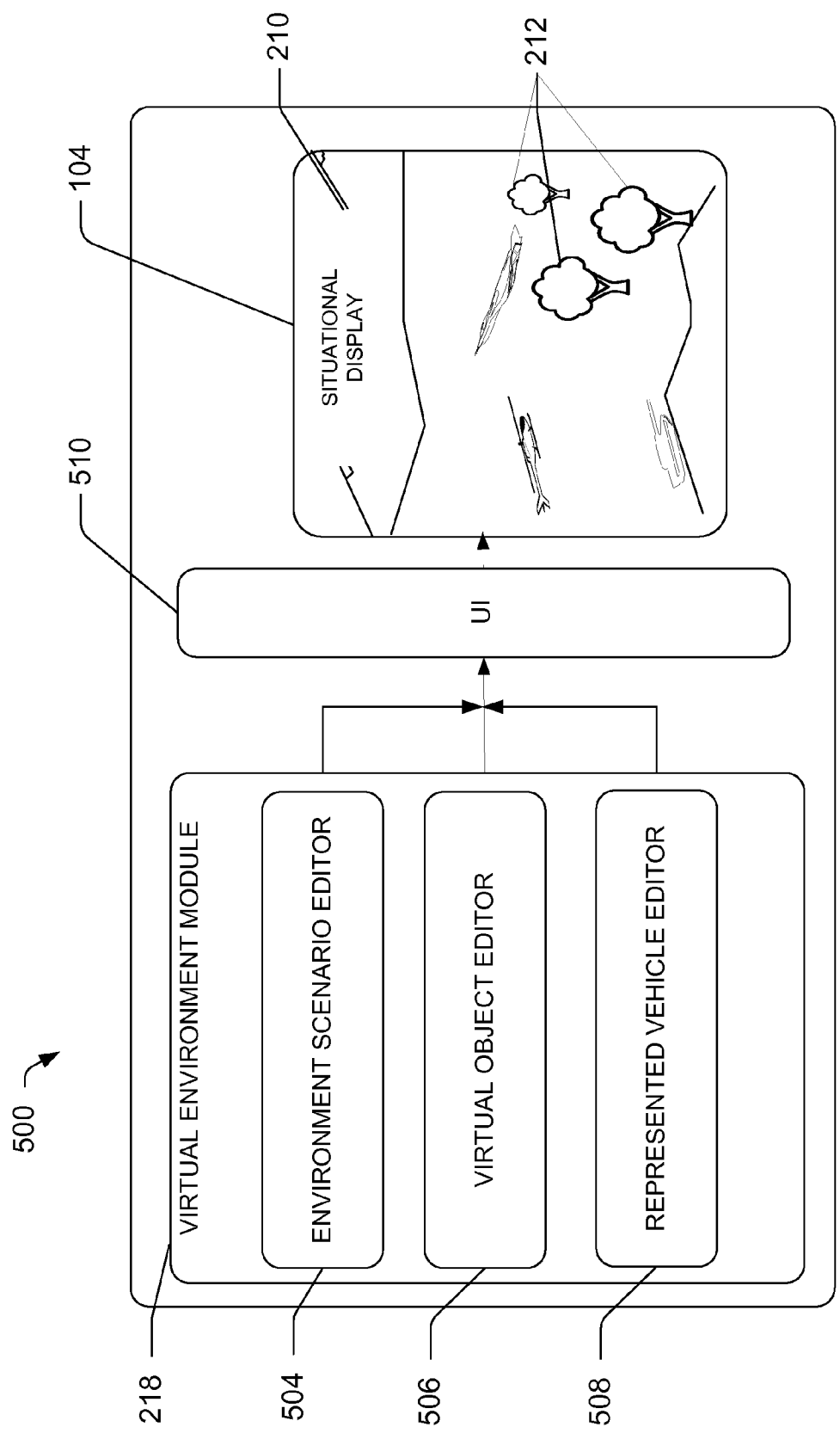
FIG. 5 is a flow diagram representing the virtual environment editor in accordance with one or more embodiments.

FIG. 5 is a flow diagram representing the virtual environment editor 500 in accordance with one or more embodiments. FIG. 5 includes various blocks representing one or more processes conducted by the virtual environment module 218. In some embodiments, the blocks may be implemented in software and executed by a processor. The arrangement of the blocks is not intended as a limitation.

As mentioned above the virtual environment module 218 may further customize the situational display 104 by editing various aspects of the situational display. As depicted in FIG. 5, the virtual environment module includes various virtual environment module editors 504-508 that edit the situational display 104. These virtual environment module editors include an environment scenario editor 504, a virtual object editor 506, and a represented vehicle editor 508.

In some embodiments, the environment scenario editor 504 edits the environment scenario 210 in various ways including changing the appearance of a currently displayed environment scenario 210. For example, the environment scenario 210 may be changed from a daytime mountainous terrain to a nighttime mountainous terrain. The environment scenario editor 504 may also edit the environment scenario 210 by removing the currently displayed environment scenario and replacing it with an entirely new environment scenario such as changing between a mountainous terrain environment and a maintenance hanger. Displaying a new environment scenario 210 may include selecting a new environment scenario from a list of pre-defined environment scenarios, importing a new environment scenario from an external source, or manually creating a new environment scenario using an environment scenario creation editor. In addition, the environment scenario editor 504 may also be used to save the currently displayed environment scenario 210.

In accordance with one or more embodiments, the virtual object editor 506 edits the virtual objects 212 of the situational display 104 in various ways including adding new virtual objects to the situational display and updating the virtual objects that are currently displayed. The virtual objects 212 may be edited to reflect changes made to the environment scenario 210 or they may be edited regardless of whether any changes were made to the environment scenario. For example, if the environment scenario 210 is changed from a mountainous terrain to a maintenance hanger, the virtual objects 212 may likewise be changed from objects typically present in a mountainous terrain such as trees to objects that are typically present in a maintenance hanger such as toolboxes.

In addition, the virtual objects 212 may be edited regardless of whether any changes were made to the environment scenario 210. Changing the appearance of the current virtual objects 212 may include editing the size of the virtual objects, moving the virtual objects from one location to another, converting the form of the currently displayed virtual objects, and changing the color of the virtual objects. The size of the virtual objects 212 may be edited, for example, by changing a small tree into a larger tree. The virtual objects 212 may be moved from one location to another, for example, by moving a tree from one location in the situational display to another location in the situational display. The form of the virtual objects 212 may be converted, for example, by converting a tree into a lake. Finally, the color of the virtual objects 212 may be changed, for example, by changing a green tree into a brown tree. The virtual objects 212 may be edited individually or may be grouped together and edited as a group.

The virtual object editor 506 may also delete current virtual objects or add new virtual objects to the situational display. Adding new virtual objects to the situational display may include selecting a virtual object to display from a list of pre-defined virtual objects, importing a virtual object from an external source, or manually creating a new virtual object using a virtual object creation editor. The virtual object editor 506 may also save the virtual objects 212.

Updates made using the virtual environment module 502 are communicated to the situational display 104 via a user interface (UI) 510. The situational display 104 is updated in real-time based on the various virtual environment module editors 504-508. The virtual environment module editors 504-508 may be executed at any point when the situational display 104 is running. For example, the represented vehicle editor 508 may be used to convert a fixed-wing represented vehicle to a VTOL represented vehicle while the represented vehicles 102 are being displayed on the situational display 104.

In some embodiments, situational display 104 can also be used to export the environment scenario 210, and virtual objects 212 in a Computer Aided Design (CAD) data format to external sources such as a simulation.

Virtual Scenario Module

Figure 6:
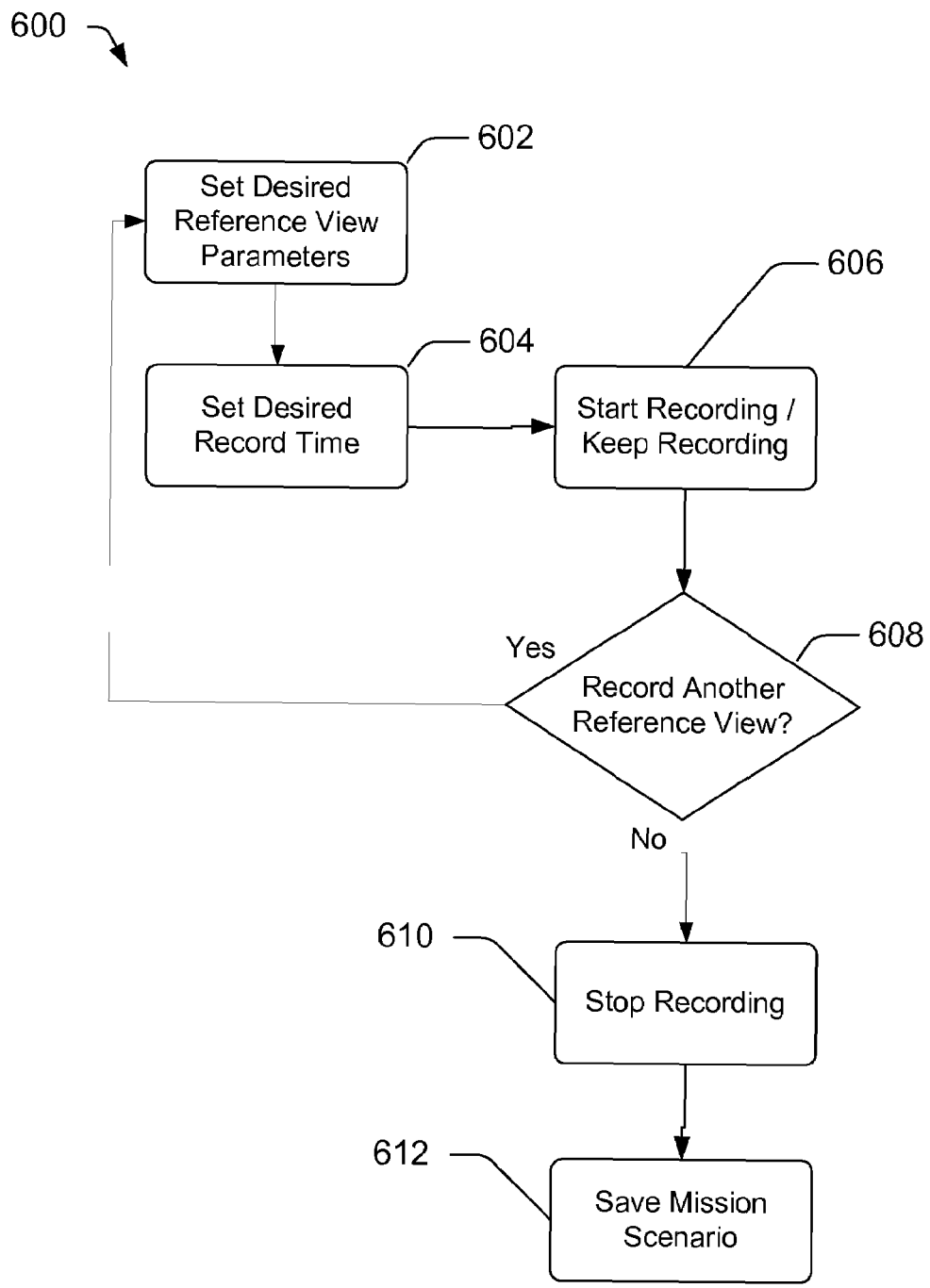
FIG. 6 is a flow diagram representing the virtual scenario editor in accordance with some embodiments of the disclosure.

FIG. 6 is a flow diagram of a process 600 for representing the virtual scenario editor in accordance with an embodiment of the present disclosure. FIG. 6 includes various blocks arranged in a logical flow diagram, the blocks representing one or more processes conducted by the virtual environment module. In some embodiments, the blocks may be implemented in software and executed by a processor. The arrangement of the blocks is not intended as a limitation. In some implementations, the blocks may be executed in series or in parallel.

As mentioned above, the virtual scenario module 220 generates a mission scenario by recording a sequence of reference views. The process 600 includes setting a desired reference view at block 602. The virtual environment module 218 is used to set the desired reference view (see FIG. 4) by establishing the desired reference view parameters for the desired reference view. For example, if the desired reference view is a first person view, the virtual environment module 218 may be used to set the desired reference view to the first person view location to the represented vehicle (102*a* of FIG. 1). After setting the desired reference view parameters, the desired record time is established at block 604. For example, the desired record time may be set to 20 seconds. At block 606 the recording commences. Once the recording commences, the virtual scenario module records the desired reference view (set at block 602) for the desired record time (set at block 604). Once the desired record time elapses, a determination is made at block 608 as to whether another reference view is desired. If another reference view is desired, the process returns to block 602 where another desired reference view is established. As an example, the desired reference view may now be a pan view. At block 604, the desired record time is set for the new desired reference view. For example, the pan view may be set to record for 10 seconds. At block 606, the desired reference view is recorded for the desired time. Since this is the second time that block 606 is executed, the process keeps recording by appending the new recording to the already recorded reference views. For example, the recording will now consist of 20 seconds of a first person reference view followed by 10 seconds of pan view. The process will loop through blocks 602-608 for all desired reference views.

Once a determination is made not to record another reference view, the process proceeds to block 610 where recording is terminated. At this point, all reference views that have been recorded constitute the recorded mission scenario. At block 612, the recorded mission scenario is saved.

In addition to creating mission scenarios, the virtual scenario module 220 may also play back recorded mission scenarios. When a recorded mission scenario is played back, the mission scenario becomes the reference view of the situational display 104. As the recorded mission scenario is played back, the situational display module 208 continues to update the represented vehicles real time based on the data parameters of the data source.

CONCLUSION

While preferred and alternate embodiments have been illustrated and described, as noted above, many changes may be made without departing from the spirit and scope of the present disclosure. Accordingly, the scope of the present disclosure is not limited by the disclosure of these preferred and alternate embodiments. Instead, the scope of the present disclosure should be determined entirely by reference to the claims that follow.

What is claimed is:

1. A method for representing one or more represented vehicles on a situational display, comprising:
   generating the situational display including a customizable environment scenario and customizable objects;
   displaying the situational display from one or more reference views, wherein the one or more reference views includes a first person view from a point of view of the one or more represented vehicles a third person point of view of the situational display, and a birds eye view of the situational display;
   displaying the one or more represented vehicle in the one or more reference view of the situational display;
   receiving a data package by a computer processor, the data package generated external to the situational display and comprising kinematic data obtained using at least one of a moveable prototype and a prototype vehicle;
   updating the represented vehicle on the situational display based at least in part on the received data package; and
   updating at least one of the environment scenario, represented vehicles, objects, and the reference views;
   wherein the customizable environment scenario includes at least one of a border control, an urban environment, a monitoring site, and a battlefield.

2. The method of claim 1, further comprising creating a mission scenario by recording the one or more reference views.

3. The method of claim 1, wherein receiving the data package for the vehicle includes receiving the data package in real-time or near real-time to update the represented vehicles based on an actual position of the prototype vehicle.

4. The method of claim 1, wherein updating the reference views is to:
   change between reference views;
   make a change within a specific reference view such as panning, titling, or zooming the reference view;
   adding a new reference view; or
   deleting a current reference view.

5. The method of claim 1, wherein the represented vehicles include at least one of an air vehicle, a ground vehicle, and a water vehicle.

6. The method of claim 1, wherein updating the objects is to:
   edit one or more of the objects;
   move one or more of the objects;
   resize one or more of the objects;
   add one or more objects to the situational display; or
   remove one or more objects from the situational display.

7. The method of claim 1, further comprising:
   creating a mission scenario by recording the one or more reference views;
   saving the recorded mission scenario; and
   playing back the saved mission scenario so that the represented vehicles are displayed in the mission scenario that is being played back.

8. One or more computer readable media comprising computer-executable instructions that, when executed by a computer, perform acts comprising:
   representing one or more represented vehicles in a situational display, the situational display including a customizable environment scenario and one or more customizable objects;
   receiving a data package by a computer processor for each of the one or more represented vehicles represented in the situational display, the data package including kinematic data;
   updating the position of the represented vehicles based on the received data package; and
   generating one or more reference views of the situational display including at least one of a first person vehicle operator view, a third person view, and a bird's eye view of the situational display;
   wherein the customizable environment scenario includes at least one of a border control, an urban environment, a monitoring site, and a battlefield.

9. One or more computer readable media as in claim 8, further comprising creating a second data package, the second data package including kinematic data for the one or more represented vehicles.

10. One or more computer readable media as in claim 9, further comprising communicating the second data package to an external source.

11. One or more computer readable media as in claim 8, further comprising:
   creating a mission scenario by recording the one or more reference views;
   saving the recorded mission scenario; and
   playing back the saved mission scenario so that the represented vehicles are displayed in the mission scenario that is being played back.

12. One or more computer readable media as in claim 8, further comprising updating the one or more customizable objects by:
   editing one or more of the objects;
   moving one or more of the objects;
   resizing one or more of the objects;
   adding one or more objects to the situational display; or
   removing one or more objects from the situational display.

13. One or more computer readable media as in claim 8, wherein generating one or more reference views further includes generating a reference view comprising a preprogrammed sequence of events.

14. One or more computer readable media as in claim 9, wherein the second data package further includes the locations of the one or more customizable objects.

15. One or more computer readable media as in claim 8, wherein the first person view includes a plurality of views from onboard the one or more represented vehicles.

16. A method for generating a mission scenario comprising:
   generating a situational display including a customizable environment scenario and customizable objects, wherein the customizable environment scenario includes at least one of a border control, an urban environment, a monitoring site, and a battlefield;
   displaying the situational display from one or more reference views;
   recording one or more reference views by a computer processor;
   updating the one or more reference views while the one or more reference views are being recorded; and
   saving the recorded one or more reference views.

17. The method of claim 16 further comprising:
   playing back the mission scenario on the situational display; and
   displaying one or more represented vehicles in situational display while the mission scenario is being played back.

18. The method of claim 17 wherein the one or more represented vehicles are displayed based at least in part on kinematic data received from an external source.

\* \* \* \* \*